US007231540B2

(12) United States Patent
Morimoto et al.

(10) Patent No.: US 7,231,540 B2
(45) Date of Patent: Jun. 12, 2007

(54) METHOD OF IDENTIFYING CONNECTION ERROR AND ELECTRONIC APPARATUS USING SAME

(75) Inventors: Katsuki Morimoto, Okayama (JP); Akira Takaishi, Okayama (JP); Motohisa Furukawa, Okayama (JP)

(73) Assignee: OMRON Corporation, Kyoto (JP)

( * ) Notice: Subject to any disclaimer, the term of this patent is extended or adjusted under 35 U.S.C. 154(b) by 441 days.

(21) Appl. No.: 10/798,185

(22) Filed: Mar. 10, 2004

(65) Prior Publication Data

US 2004/0205378 A1 Oct. 14, 2004

(30) Foreign Application Priority Data

Mar. 12, 2003 (JP) ............................ 2003-066042

(51) Int. Cl.
*G06F 11/00* (2006.01)

(52) U.S. Cl. ............................................ 714/4; 714/27

(58) Field of Classification Search .................... 714/4, 714/27, 43, 56, 25
See application file for complete search history.

(56) References Cited

U.S. PATENT DOCUMENTS 5,943,277 A * 8/1999 Shimizu ..................... 365/201
6,457,071 B1 * 9/2002 Thorland et al. ............. 710/19
2002/0076989 A1 6/2002 Goers et al.
2003/0212785 A1 * 11/2003 Jibbe .......................... 709/224

FOREIGN PATENT DOCUMENTS

JP 10270120 9/1998
JP 11176723 2/1999

OTHER PUBLICATIONS

European Search Report dated Feb. 22, 2005, Application No. 04004448.9-2214.

* cited by examiner

*Primary Examiner*—Nadeem Iqbal
(74) *Attorney, Agent, or Firm*—Beyer Weaver LLP

(57) ABSTRACT

An electronic apparatus is formed with a first module having a plurality of connectors and a plurality of second modules each connected to the first module through a different one of the connectors. The second modules are identified for each connector or as a combination corresponding to a plurality of connectors and it is checked whether they are preliminarily registered or not. If any of them is found to be not preliminarily registered, a display is made to the effect that a connection error has been committed and the start of a normal operation of the apparatus of prevented.

12 Claims, 11 Drawing Sheets

METHOD OF IDENTIFYING CONNECTION ERROR AND ELECTRONIC APPARATUS USING SAME

BACKGROUND OF THE INVENTION

This invention relates to an effective method of identifying a connection error for preventing errors in electrically connecting modules having various functions. This invention relates also to electronic apparatus of various kinds such as apparatus for measurements and adjustments adapted to use such a method.

Various methods for preventing connection errors have been proposed. As a method of preventing connection errors between units having same external characteristics but different in electronic specifications, Japanese Patent Publication Tokkai 11-307180, for example, described a method of reversing the male-female relationship between the connectors of two units from that of other two pairs of units such that it will be prevented for one of the two units from having the other of the other two units erroneously connected thereto.

Since it is only a matter of reversing the male-female relationship by this prior art method, it is of no use in situations where many connectors are provided to one unit and many units can be connected to each connector since there will be many combinations with the same male-female relationship.

In Japanese Patent Application Tokugan 2002-14490 filed May 20, 2002, the present inventors proposed electronic apparatus which may be produced by having many kinds of mounting substrates prepared such as substrates for input, output, power source and communication and mounting necessary ones of these substrates to a base substrate of a common type so as to obtain apparatus of desired kinds. Since such apparatus are obtained by selecting many kinds of mounting substrates with different specifications and functions selectively and mounting them to a plurality of connectors on a common base substrate, there may be situations where mounting substrates with different specifications and functions are connected in common to a same connector. In other words, any one of a plurality of different kinds of mounting substrates is selectively mounted to a connector and it is presupposed that connecting substrates of different types are adapted to be mounted to a same connector. Thus, it is not possible to use physical means of the prior art technology described above to prevent base substrates of different kinds from being mounted. Since a substrate of an incorrect kind may be mounted for producing a desired type of apparatus, it is necessary to avoid such connection errors.

SUMMARY OF THE INVENTION

It is therefore an object of object of this invention in view of the above to identify a connection error when it is made and to correct such an erroneously connected condition, rather than to use physical means to prevent a connection error.

In view of the above, the invention provides a method of identifying a connection error, when a first module is electrically connected to a plurality of second modules, by the steps of distinguishing the second modules connected to the first module, determining whether the distinguished second modules are preliminarily registered or not, and judging that there is a connection error if the distinguished second modules are not preliminarily registered, and each of these steps is carried out by the first module or any of the second modules. By such a method, a connection error can be identified dependably by preliminarily registering the kinds of modules intended to be connected and the user can take appropriate measures to correct a connection error when it is identified. In the above, each "module" is a component of a device or an apparatus having an identifiable function and hence may be a unit or a substrate, and to "distinguish" a second module means to identify its function or its type based on its function.

According to an embodiment of the invention, the first module has a plurality of connectors each having a second module mounted thereto and the second modules are preliminarily registered for each of these connectors. The step of judging comprises judging for each of these connectors whether the distinguished second module is not preliminarily registered. In the above, the connectors may be jacks or plugs for electrically connecting the modules. According to this embodiment of the invention, connection errors are examined for each of the connectors.

According to another preferred embodiment of the invention, a plurality of second modules are preliminarily registered as a combination corresponding to a plurality of connectors and the step of judging comprises judging whether such a combination is preliminarily registered.

The invention further includes methods of identifying a connection error characterized as judging a connection error also if a module cannot be distinguished in the step of distinguishing and also including the step of making a report when it is judged in the step of judging that there is a connection error. In this way, a connection error is identified when, for example, a module which is not a second module and cannot be identified is found to be connected or when a module is not sufficiently well connected, that is, when the connection is incomplete.

An electronic apparatus embodying this invention is characterized as comprising a first module having a plurality of connectors and a plurality of second modules each connected to the first module through a different one of these connectors and is provided with a registration part where a plurality of types of second modules are preliminarily registered, a distinguishing part for distinguishing second modules connected to the connectors, a determining part for determining whether the distinguished second module is of a type preliminarily registered in the registration part, and a judging part for judging that there is a connection error of the second module if the distinguished second module is determined to be not registered in the registration part. If intended types of second module are preliminarily registered in the registration part, a connection error can be easily identified and the user can take appropriate measures on the basis of the result of judgment in order to eliminate the detected error.

The electronic apparatus of this invention may have the types of second modules registered corresponding to each of the connectors of the first module and its determining part may be adapted to determine whether a distinguished second module is of a type preliminarily registered corresponding to each of the connectors. With an apparatus of this kind, a connection error can be checked for each connector.

The preliminary registration may be done as combinations corresponding to the connectors and the determining part may be adapted to determine whether the distinguished second modules are of a preliminarily registered type as a combination.

The judging part may be adapted to judge that there is connection error also when the distinguishing part fails to distinguish the second module such as when a different kind of module was connected or when the connection was not made sufficiently well and the connected module cannot be clearly identified.

An electronic apparatus according to a preferred embodiment of the invention further comprises a reporting part for making a report when a connection error is identified by the judging part such that the user can take an appropriate measure in response to the report of the error.

A limiting part may also be provided for limiting, when it is judged that there is a connection error, at least a portion of operations which are normally carried out by the apparatus.

An apparatus according to this invention may be formed by using as its first module a base substrate having common wiring that is connected to each of the aforementioned connectors. The second module may be a mounting substrate having a dedicated circuit corresponding to a certain specified function and is adapted to become connected to the common wiring as the mounting substrate is connected to the connector. A control circuit is mounted either to the base substrate or to the mounting board and is connected to the common wiring. The control circuit includes at least the aforementioned distinguishing, determining and judging parts and serves to identify the mounting board connected to the connector of the base substrate and to function accordingly as a specified one of a plurality of types of apparatus.

In the above, the common wiring means wiring that is used in common, say, by a plurality of mounting substrates and apparatus of different kinds and examples of the "function" include not only functions for input, output, power source and communication but also analog input, digital input and output formats such as relay output and transistor output, as well as the number of input-output points. Examples of "dedicated circuit" include input circuit, output circuit and power source circuit corresponding to such functions. Examples of type of apparatus include not only temperature controllers but also other kinds of electronic apparatus such as digital panel meter. Even among apparatus of the same kind such as temperature controllers, different kinds of their high-end types and low-end types as well as the number of their input-output terminals and their output format are included.

According to this invention, therefore, a mounting substrate with a dedicated circuit corresponding to a specified function is connected to a connector of the base substrate having a common wiring so as to have the dedicated circuit connected to the common wiring. A control circuit which is mounted either to the base substrate or to the mounting substrate distinguishes the mounting board so as to cause the apparatus to function as an apparatus of a desired type. Thus, an apparatus of a desired type can be formed merely by selecting a mounting substrate having the function corresponding to the desired type. In other words, apparatus having identical functions such as apparatus having a same relay output function can use common mounting substrates such as relay output substrates corresponding to this function.

DETAILED DESCRIPTION OF THE INVENTION

Figure 1A:
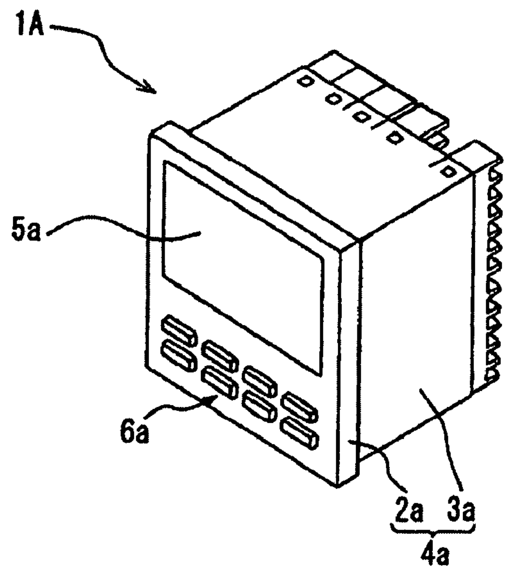
FIGS. 1A, 1B and 1C, together referred to as FIG. 1, are diagonal views of temperature controllers embodying this invention.
Figure 1B:
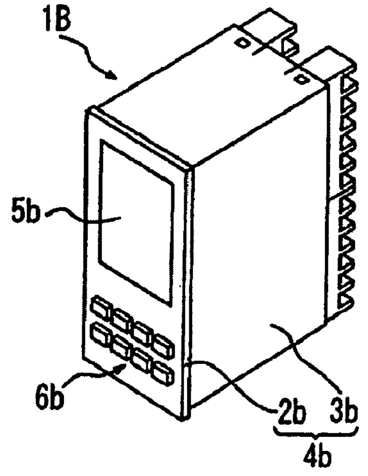
Figure 1C:
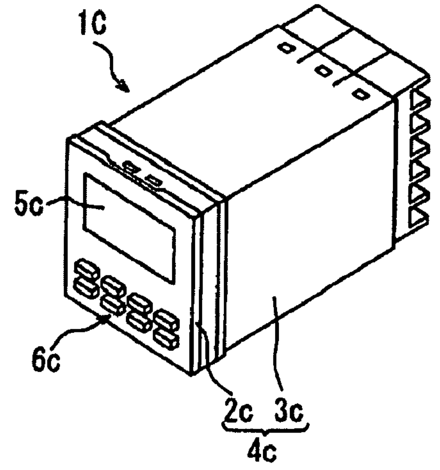

The invention is described next by way of examples with reference to the drawings. FIGS. 1A, 1B and 1C (together referred to as FIG. 1) respectively show a large-size temperature controller 1A, a medium-size temperature controller 1B and a small-size temperature controller 1C as examples of electronic apparatus embodying this invention.

According to the DIN standard, the external dimensions of the front case of the large-size temperature controller 1A of FIG. 1A are 96×96 mm, those of the medium-size temperature controller 1B of FIG. 1B are 48×96 mm and those of the small-size temperature controller 1C of FIG. 1C are 48×48 mm.

Each of the temperature controllers 1A, 1B and 1C is comprised of a case 4*a*, 4*b* or 4*c*, including a front case 2*a*, 2*b* or 2*c* and a rear case 3*a*, 3*b* or 3*c*. The cases 4*a*, 4*b* and 4*c* are of different sizes.

Each of the front cases 2*a*-2*c* includes a display part 5*a*, 5*b* or 5*c* made, for example, of a rectangular liquid crystal panel for displaying temperature data such as the current temperature and a target temperature. Below each of these display parts 5*a*-5*c* are a plurality of operation keys 6*a*, 6*b* or 6*c* for setting various functions. Each of the cases 4*a*-4*c* contains a plurality of circuit boards, as will be explained below. In order that these circuit boards can be used in common, they are basically all of a same circuit structure.

Figure 2:
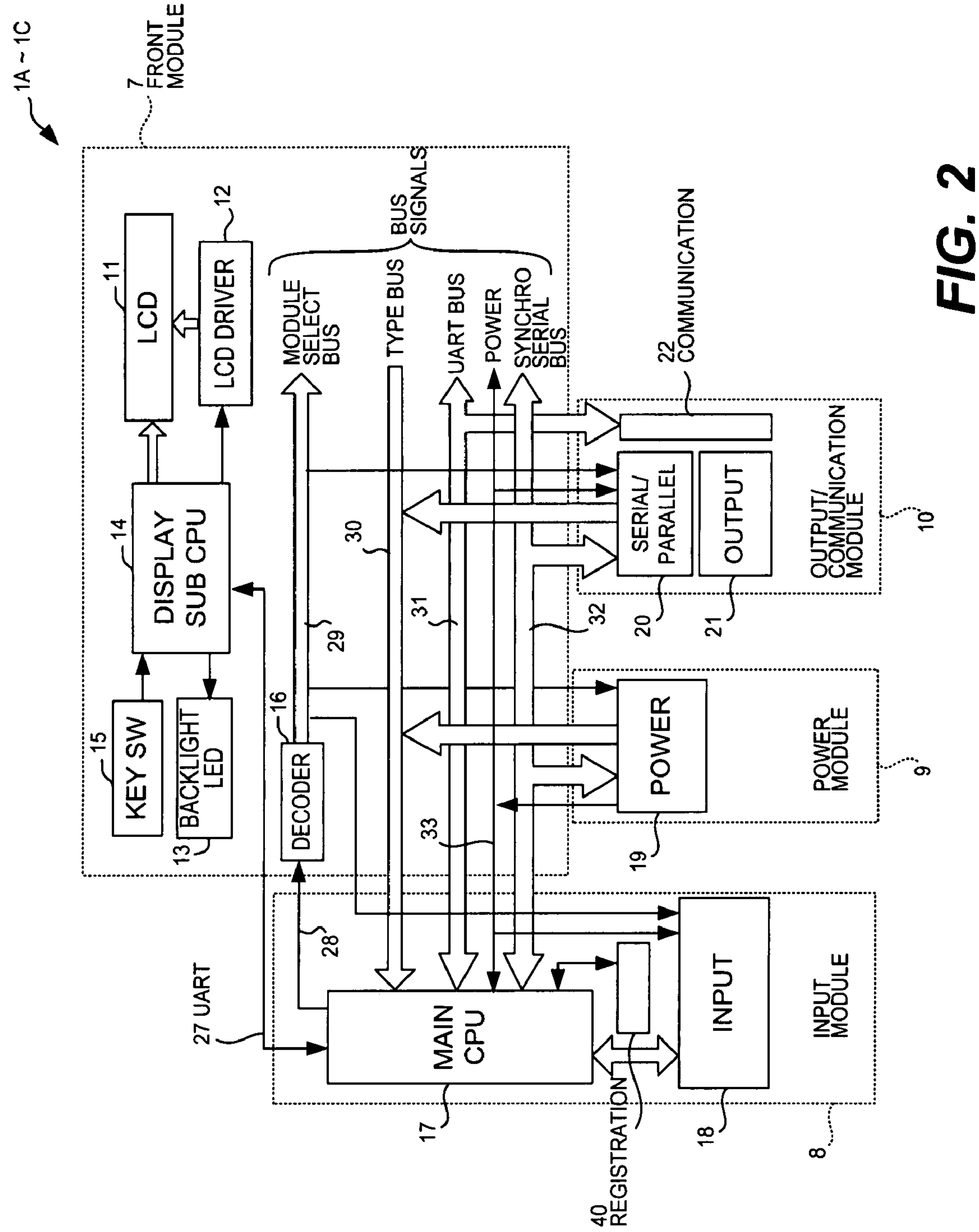
FIG. 2 is a block diagram showing the circuit structure of the temperature controllers of FIG. 1.

FIG. 2 is a block diagram for showing this common circuit structure. According to this example, each of the temperature controllers 1A-1C comprises a first module consisting of a front module 7 and a second module consisting of an input module 8, a power module 9 and an output/communication module 10. The output/communication module 10 may be split into an output module and a communication module.

The front module 7 is formed with a base substrate adapted to be contained in the front case 2*a*, 2*b* or 2*c* and is of a specified size, depending on whether it is for the large-size, medium-size or small-size temperature controller. The front module 7 is provided not only with a liquid crystal cell (LCD) 11, an LCD driver 12, a back light LED 13 and a display sub-CPU 14 for making displays on the aforementioned display part 5*a*, 5*b* or 5*c* but also key switches 15 and a decoder 16 (to be described below). The front module 7 is further provided with a common wiring for connecting to the input module 8, the power module 9 and the output/communication module 10 through a bus.

The input module 8 includes not only a main CPU 17 serving as a control circuit for controlling the actions of the different types of temperature controllers 1A, 1B and 1C but also an input circuit 18 for receiving an input from a temperature sensor (not shown). The input module 8 is made of a temperature controller base substrate serving as a mounting substrate for detachably attaching through a connector to the base substrate of the front module 7. This temperature controller base substrate is commonly used for the temperature controllers 1A-1C of all different sizes and specifications such as output format. In other words, the main CPU 17 of the input module 8 can carry out not only controls of three different types (large, medium and small) of temperature controller but also controls of different types with different specifications such as different output formats. The main CPU 17 is adapted to identify the base substrates for the individual modules 9 and 10 mounted to the base substrate of the front module 7 and to carry out the controls of the corresponding type of temperature controller.

In order to identify a connection error between the front module 7 as the first module and the input module 8, the power module 9 and the output/communication module 10 as the second module, the input module 8 is further provided with a registration part 40. The main CPU 17 of the input module 8 is provided with the functions of a distinguisher part for distinguishing the second module connected to the first module, as also will be explained in detail below, a determining part for determining whether or not the distinguished second module is the same as the second module preliminarily registered in the aforementioned registration part 40 and a judging part for judging that a connection error has been made if it is determined by the determining part that it was not the second module preliminarily registered in the registration part 40.

The power module 9 is provided with a power circuit 19 and serves to supply a DC or AC power source to each part and is formed with a plurality of substrates for AC and DC power sources as detachably mounted mounting substrates mounted through connectors to the aforementioned base substrate. These substrates for the power sources are prepared so as to be commonly usable for each of the large-, medium- and small-size types. A suitable substrate for power source can be selected and mounted to the base substrate forming the front module 7, depending on the given voltage specification and the like.

The output-communication module 10 is provided not only with a serial/parallel conversion circuit 20 but also with an output circuit 21 or a communication circuit 22 and serves to transmit outputs of different kinds such as relay outputs, current outputs, transistor open collector outputs and BCD outputs as well as communication outputs such as RS-485 and RS-232C. Thus, the output-communication module 10 is formed with a plurality of output/communication substrates such as relay output substrate, current output substrate, transistor open collector output substrate, BCD output substrate, RS-485 communication output substrate and RS-232C communication output substrate which correspond to these output types and are detachably connected through a connector to the base substrate of the front module 7. These output/communication substrates are basically designed to be usable in common for each of the large-, medium- and small-size types and suitable output/communication substrates can be selected and mounted to the base substrate of the front module 7, depending on the desired functions and specifications.

The relay output substrate, current output substrate and transistor open collector output substrate of the output/communication module 10 are usable in common for each of the large-, medium- and small-size types. The RS-485 communication output substrate is usable only for the types with the communication function.

The base substrate for the front module 7 is made in a size corresponding to the front case and, as explained above, is each for the large-size, medium-size or small-size type. The base substrate is provided with a plurality of connectors for detachably connecting a temperature controller substrate, a power source substrate or an output/communication substrate.

Figure 3A:
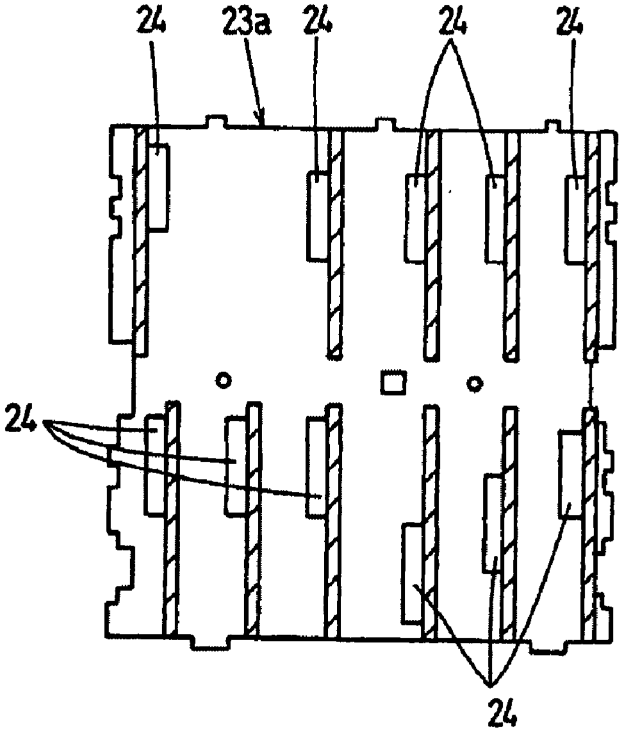
FIGS. 3A, 3B and 3C, together referred to as FIG. 3, are drawings for showing the positions of the connectors of the temperature controllers respectively shown in FIGS. 1A, 1B and 1C.
Figure 3B:
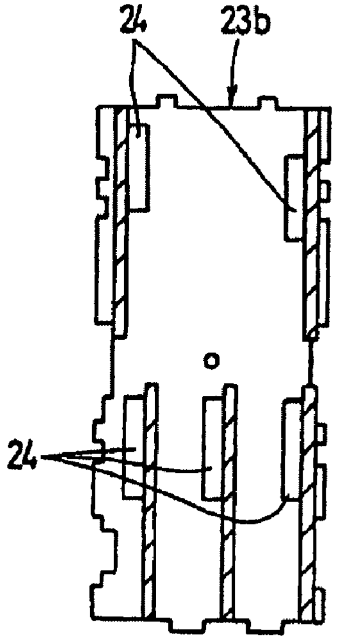
Figure 3C:
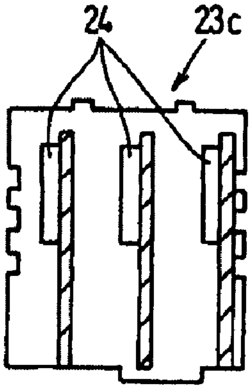

FIGS. 3A, 3B and 3C (together referred to as FIG. 3) show the base substrate 23*a*, 23*b* and 23*c* each for the front module 7 of the temperature controllers respectively shown in FIGS. 1A, 1B and 1C together with the positions of their connectors 24.

The base substrate 23*a* of the large-size temperature controller 1A shown in FIG. 3A has the dimensions corresponding to the front case 2*a*, having eleven connectors 24 for mounting the substrates ("module substrates") for the modules 8, 9 and 10. The hatched portions in FIG. 3 show where module substrates are intended to be mounted. The base substrate 23*b* of the medium-size temperature controller 1B shown in FIG. 3B has five connectors 24 and the base substrate 23*c* of the small-size temperature controller 1C shown in FIG. 3C has three connectors 24.

Figure 4:
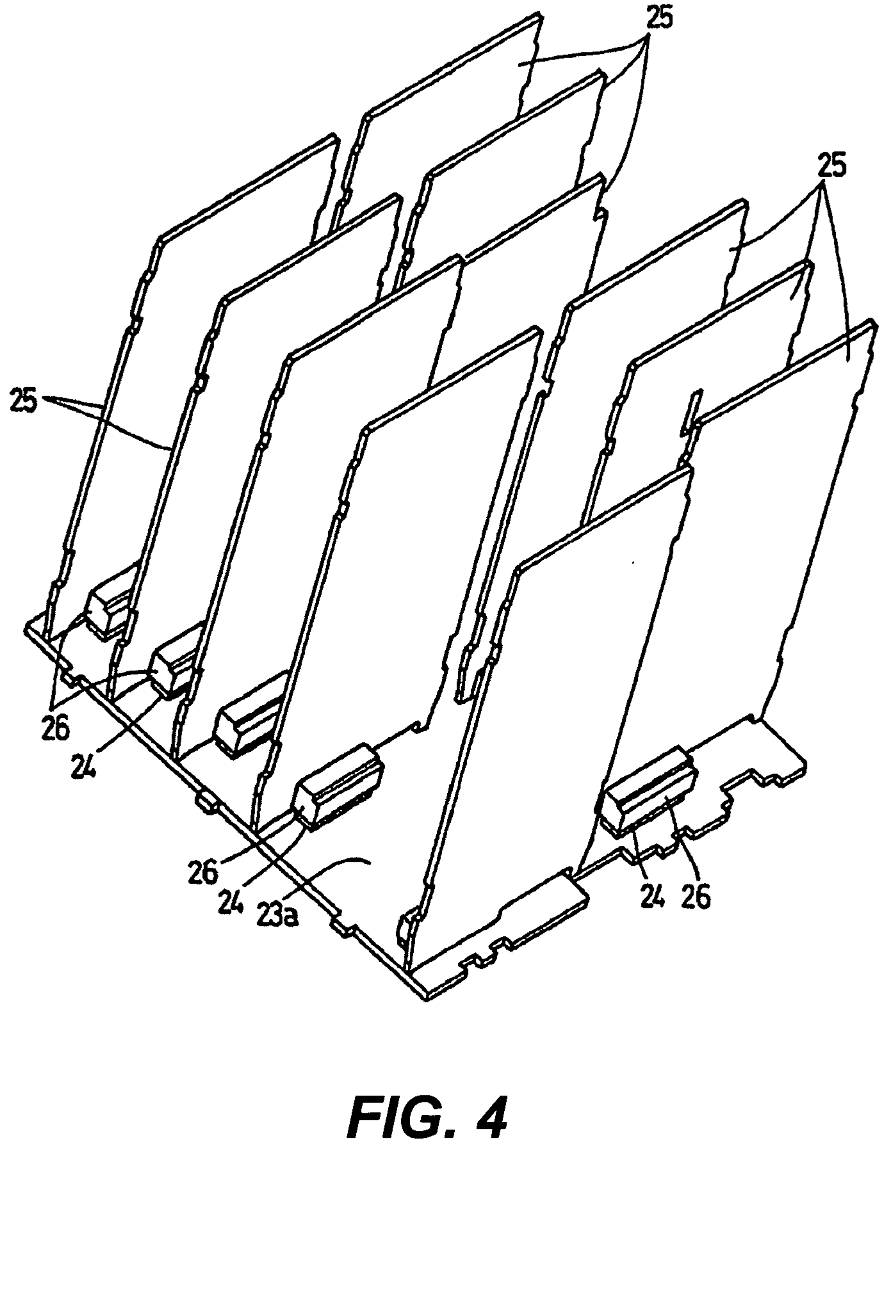
FIG. 4 is a diagonal view of a base substrate with module substrates mounted thereto.

FIG. 4 shows the large-size base substrate 23*a* having eleven module substrates 25 mounted to its connectors 24 through connectors 26 on these module substrates 25. For the convenience of disclosure, electronic components or the like mounted to each of the module substrates 25 are omitted in FIG. 4 but it is to be understood that each of these module substrates 25 carry components with different functions.

The base substrates 23*a*-23*c* for the front modules 7 have bus lines as common wiring for connecting the individual modules 8, 9 and 10. As shown in FIG. 2, the base substrates 23*a*-23*c* are provided with a serial bus (UART) 27 for data communications between the main CPU 17 of the input module 8 and the display sub-CPU 14 of the front module 7, a module address bus 28 for address signals serving to generate module select signals for accessing the individual modules 8, 9 and 10, a module select bus 29 for the select signals for accessing the individual modules 8, 9 and 10, a type (TYPE) bus 30 for distinguishing kinds such as functions of the module substrates of the individual modules 8, 9 and 10, a UART bus 31 for external communications, a synchronized serial bus 32 for data communications with the individual modules 8, 9 and 10 and a power line 33. The synchronized serial bus 32 actually comprises a plurality of buses, and the power line 33 actually comprises a plurality of different lines.

Figure 5:
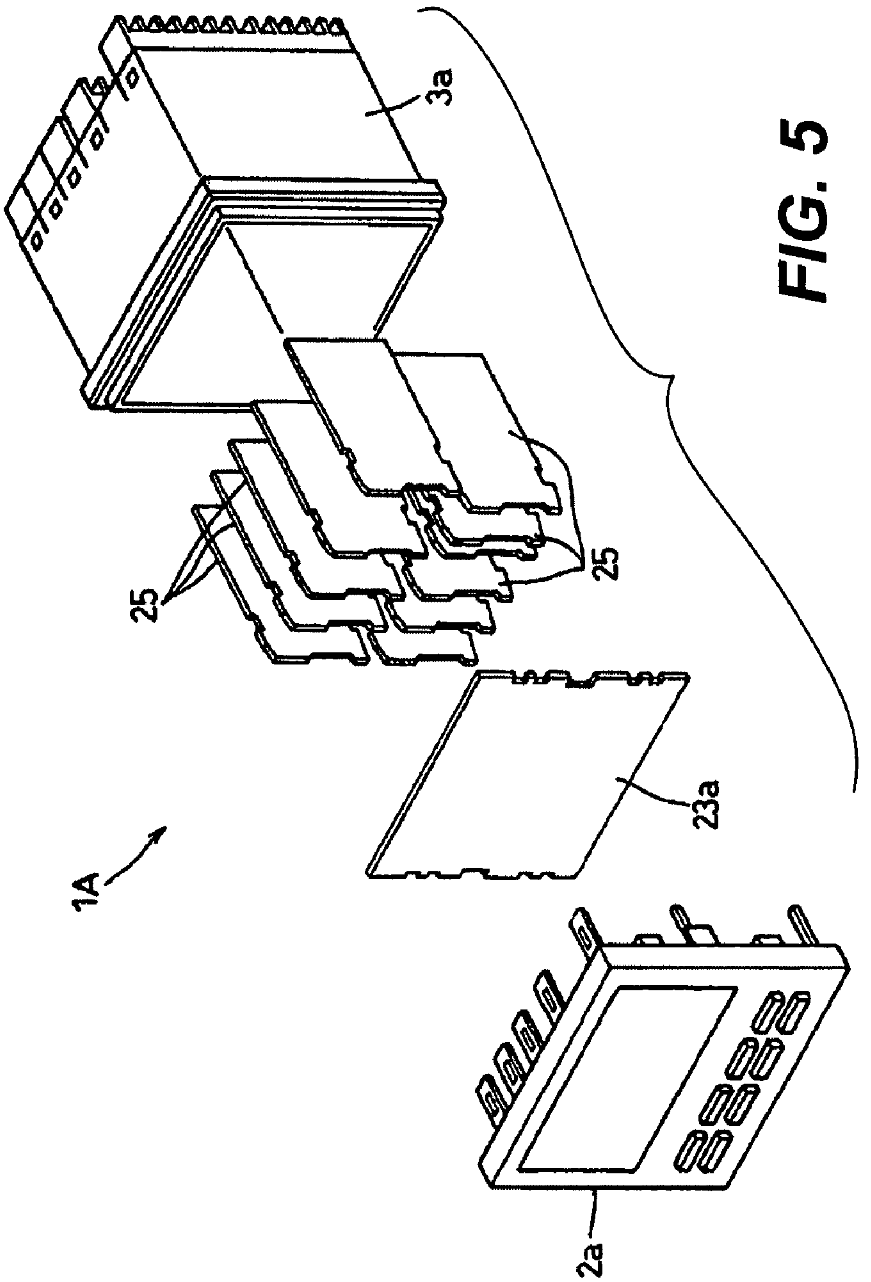
FIG. 5 is an exploded diagonal view showing the substrate structure of a large-size temperature controller.
Figure 6:
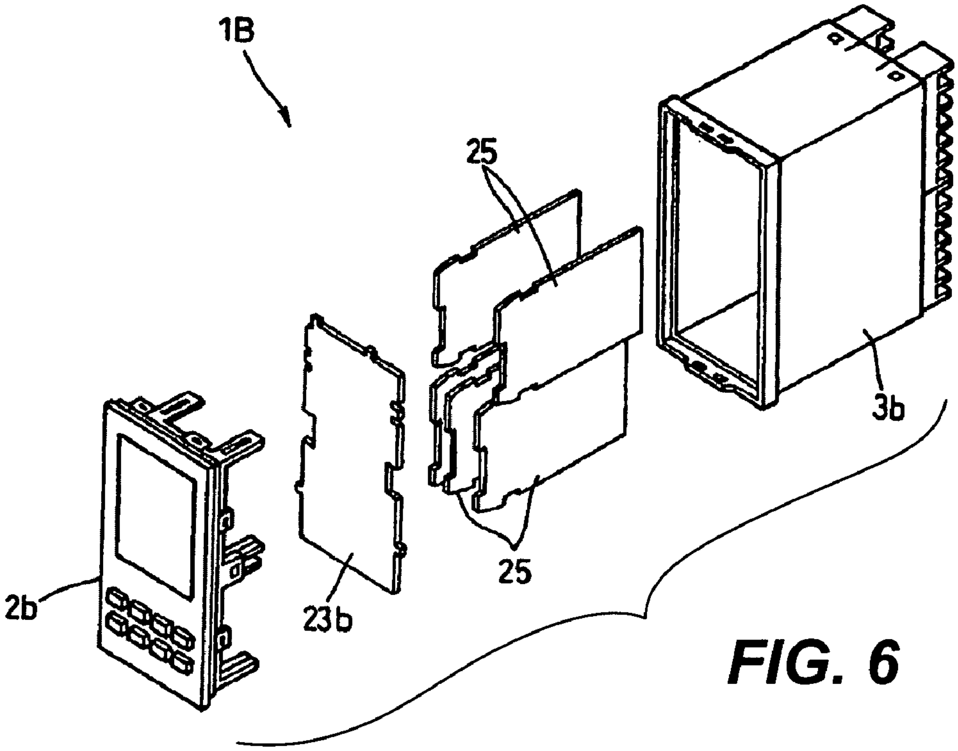
FIG. 6 is an exploded diagonal view showing the substrate structure of a medium-size temperature controller.
Figure 7:
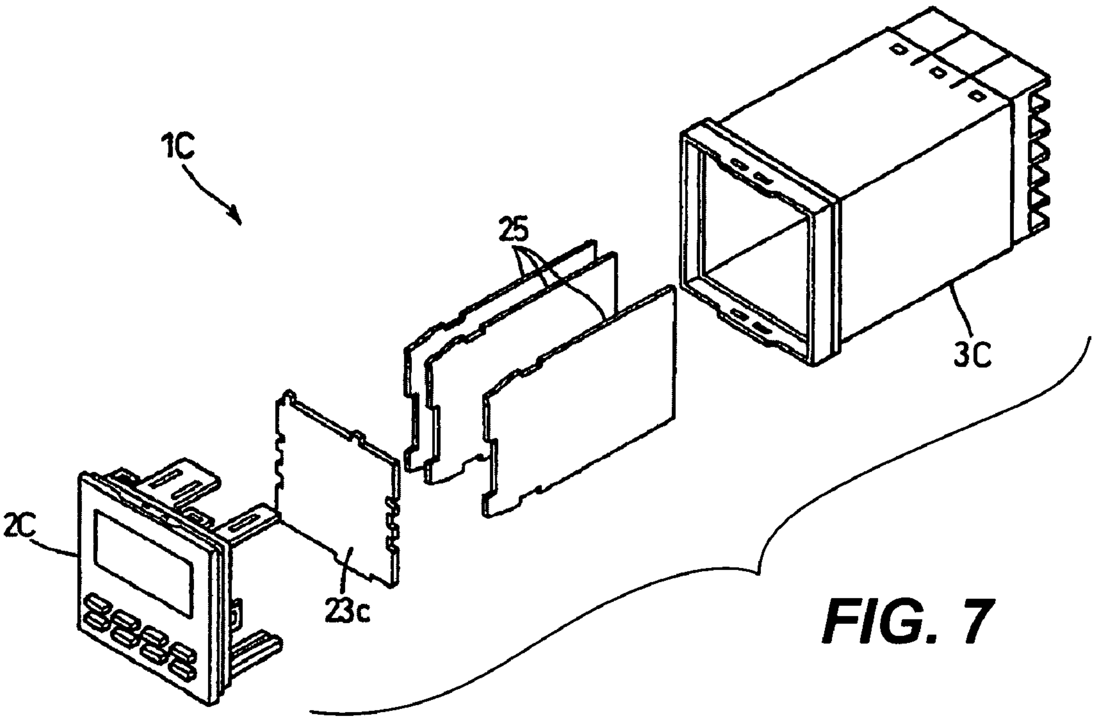
FIG. 7 is an exploded diagonal view showing the substrate structure of a small-size temperature controller.

Since module substrates of a common kind are used for the input, power and output/communication modules 8, 9 and 10 for temperature controllers of all three different sizes, each module substrate is of the size small enough to be contained in the small-size temperature controller 1C. FIGS. 5, 6 and 7 show how base substrates 23*a*-23*c* and module substrates 25 are fit inside the cases 4*a*-4*c* of the temperature controllers 1A-1C of the large-size, medium-size and small-size, respectively. In FIGS. 5-7, too, various electronic components and the like that are mounted to these substrates are omitted.

FIG. 5 shows a large-size temperature controller 1A with eleven module substrates 25 mounted to the base substrate 23*a* of its front module 7. These module substrates 25 include a temperature controller substrate for the inner module 8, a power substrate for the power module 9 and a plurality of output/communication substrates for the output/communication module 10.

FIG. 6 shows a medium-size temperature controller 1B with five module substrates 25 mounted to the base substrate 23*b* of its front module 7. These module substrates 25 include a temperature controller substrate for the inner module 8, a power substrate for the power module 9 and a plurality of output/communication substrates for the output/communication module 10.

FIG. 7 shows a small-size temperature controller 1C with three module substrates 25 mounted to the base substrate 23*c* of its front module 7. These module substrates 25 include a temperature controller substrate for the inner module 8, a power substrate for the power module 9 and a output/communication substrate for the output/communication module 10. Thus, each of these three substrates corresponds to a different one of the three modules 8, 9 and 10.

Figure 8:
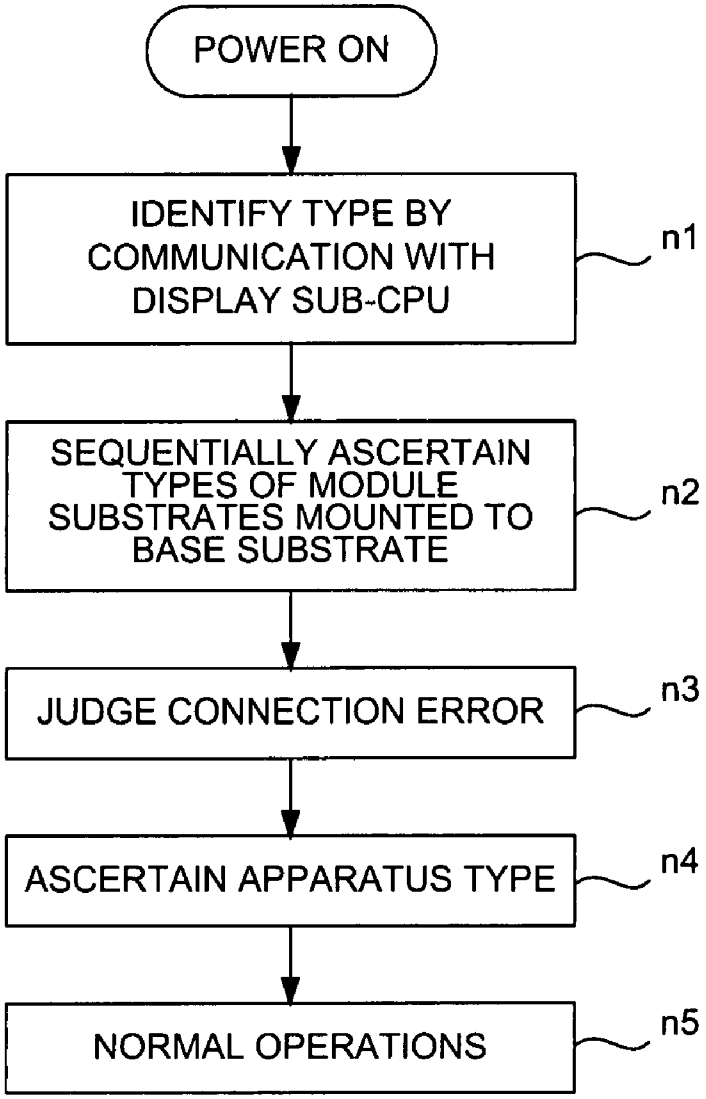
FIGS. 8 and 9 are flowcharts of operations of the temperature controller of this invention.

FIGS. 5 and 6 are each intended to show only an example of substrate structure. In the case of a large-size or medium-size substrate, the number and kinds of module substrates 25 to be mounted to the base substrates 23*a* and 23*b* may be selected appropriately The control operations by the main CPU 17 of the temperature controllers 1A-1C thus structured as explained above, having a plurality of module substrates 25 for forming the input module 8, the power module 9 and the output/communication module 10 mounted to the base substrates 23*a*-23*c* are explained next with reference to the flowchart of FIG. 8.

When power is switched on, the main CPU 17 of the input module 8 poses a question to the display sub-CPU 14 of the base substrate 23*a*, 23*b* or 23*c* of the front module 7 through serial communication in order to ascertain whether it is large-size, medium-size or small-size. Since each of the base substrates 23*a*-23*c* is of a different size, as explained above, the display sub-CPU 14 is ready to answer, and the main CPU 17 comes to identify the type (size) of the temperature controller from the received answer (Step n1).

Next, the types of the module substrates 25 mounted to the individual connectors 24 of the base substrate 23*a*, 23*b* or 23*c* are sequentially ascertained (Step n2). In other words, the functions of the module substrates 25 mounted as the power module 9 or the output/communication module 10 are sequentially read in and their types are distinguished by using the module select bus 29 and the type bus 30, as will be explained below in detail.

Figure 9:
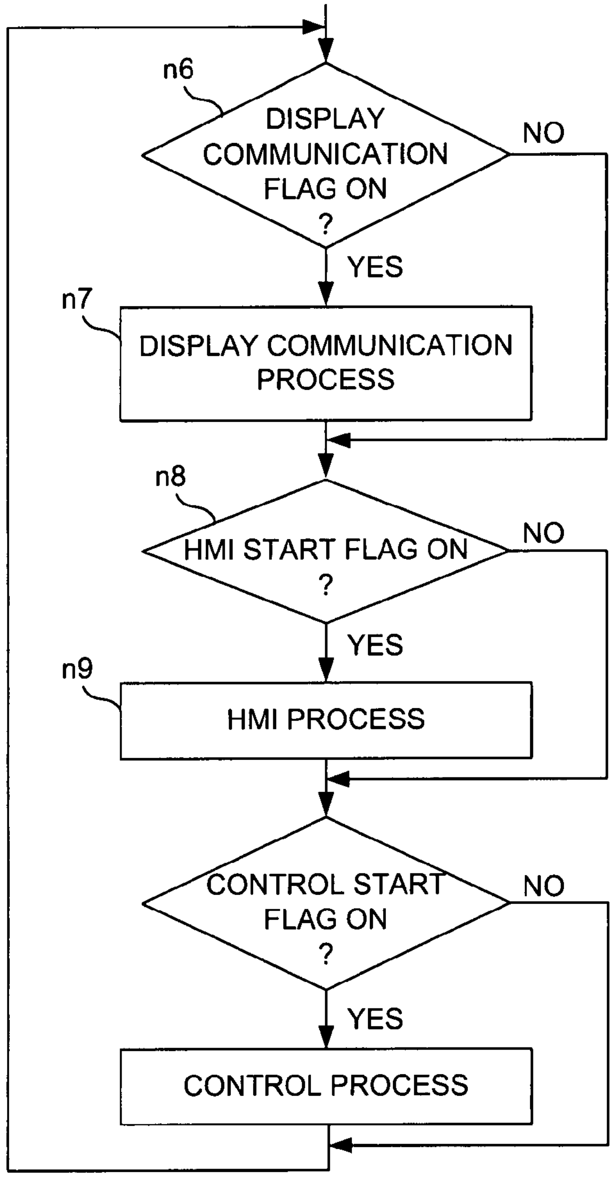

On the basis of this distinction, a judgment process to be described below is carries out next (Step n3). If it is judged that there is no connection error, the main CPU 17 ascertains the type (size) of the temperature controller from the result of the previous step and other information such as its output format (Step n4). Thereafter, normal operations for the ascertained type of temperature controller are started (Step n5) as shown by the flowchart of FIG. 9.

In the normal operations, it is initially checked to determine whether the display communication flag indicative of a request for a display process or a communication process is switched on or not (Step n6). If this flag is switched on (Yes in Step n6), a display communication process is carried out (Step n7) and a key operation is carried out to check whether or not the HMI (human-machine interface) start flag is switched on to indicate that there is a corresponding process to be carried out (Step n8). If this flag is switched on (Yes in Step n8), the corresponding HMI process is carried out (Step n9). It is next checked whether or not the control start flag is switched on to indicate that a control process must be carried out (Step n10). If this flag is switched on (Yes in Step n10), a temperature control process is carried out (Step n 1) and the routine goes back to Step n6.

Next, the process for identifying each module substrate 25 mounted to the base substrate 23*a*-23*c* is explained with reference to FIGS. 10 and 11.

Figure 10:
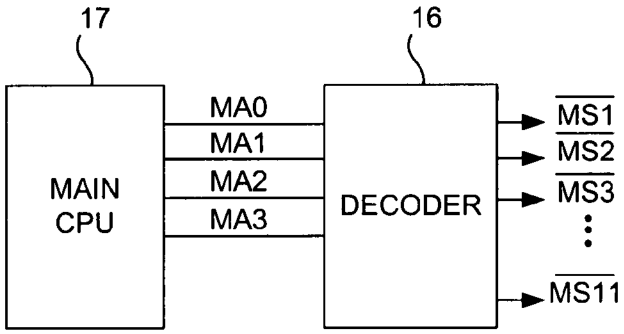
FIG. 10 is a schematic drawing for showing the generation of module select signals for distinguishing module substrates.
Figure 11:
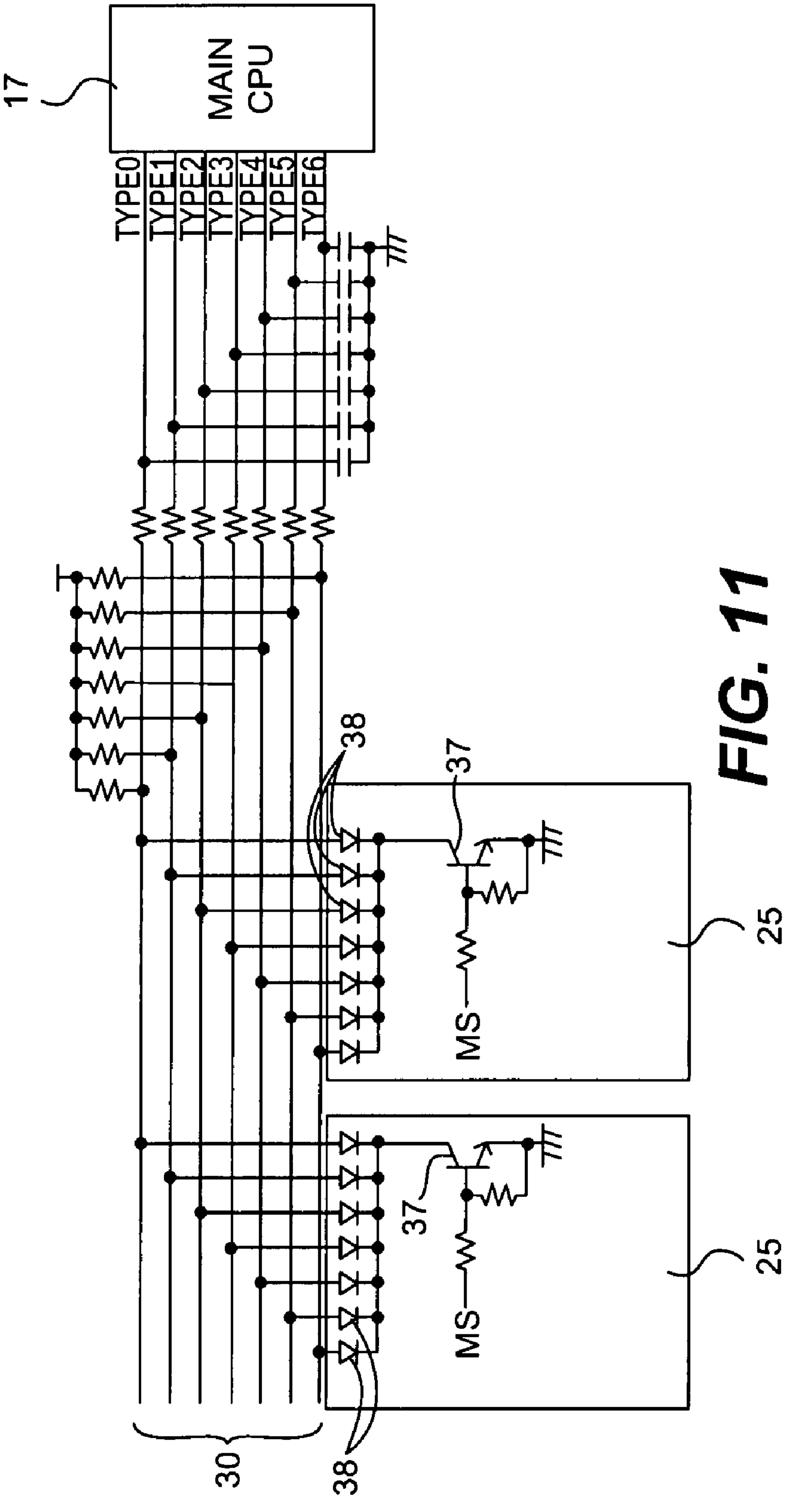
FIG. 11 is a schematic drawing for showing the generation of type signals for distinguishing module substrates.

To start, as shown in FIG. 10, the main CPU 17 outputs 4-bit module address signal MA0-MA3 to the decoder 16 (shown in FIG. 2) of the base substrates 23*a*-23*c* for sequentially specifying a maximum of eleven connectors 24 of the base substrate 23*a*. The decoder 16 serves to decode this module address signal and to thereby output an inverted MS signal for specifying any of the modules corresponding to the eleven connectors 24 such that the transistor 37 of the corresponding module substrate 25 is switched on by the inverted MS signal as shown in FIG. 11. Each module substrate 25 is provided with a plurality of diodes 38 adapted to become conductive when the transistor 37 is switched on and the number of these diodes 38 corresponds to the type of the module substrate 25.

Accordingly, type signals TYPE0-TYPE6 corresponding to the number of the diodes 38 of the module substrate 25 mounted to the specified connector 24 are transmitted to the main CPU 17 through the type bus 30, allowing the main CPU 17 to determine the kind of the module substrate 25 mounted to a specified connector 24. After the module substrates are thus distinguished and their types are determined, operations corresponding to them are carried out.

Since module substrates can be used in common according to this invention for input, power and output/communication modules of large-size, medium-size and small-size temperature controllers 1A-1C, design costs can be reduced and the assembly work becomes simplified. Since the quantity of mass-produced substrates of the same size can be increased, the production cost can be further reduced.

Next, the method of judging a connection error is explained for the temperature controllers 1A-1C of this invention.

As explained above, module substrates 25 of different kinds for forming the input module 8, the power module 9 and the output/communication module 10 (which are the second modules) are mounted to the connectors 24 of base substrates 23*a*-23*c* of the front module 7 (which is the first module). The present invention is so structured that if any of these module substrates 25 with different functions and specifications is erroneously connected to the connectors 24 of the base substrates 23*a*-23*c*, such an erroneous condition can be identified and rectified.

According to one embodiment of the invention, the module substrates 25 intended to be mounted to the base substrates 23*a*-23*c* are preliminarily registered in the registration part 40. As the module substrates 25 mounted to the base substrates 23*a*-23*c* are distinguished as explained above, it is judged whether the module substrates 25 thus distinguished are already registered or not. If they are found not to be registered, it is concluded that there is a connection error and an error display is made on the display parts 5*a*, 5*b* and 5*c* and a measure is taken to prevent the shift to the normal operations Next, a situation of a connection error is explained more in detail by using the large-size temperature controller 1A as an example.

Figure 12:
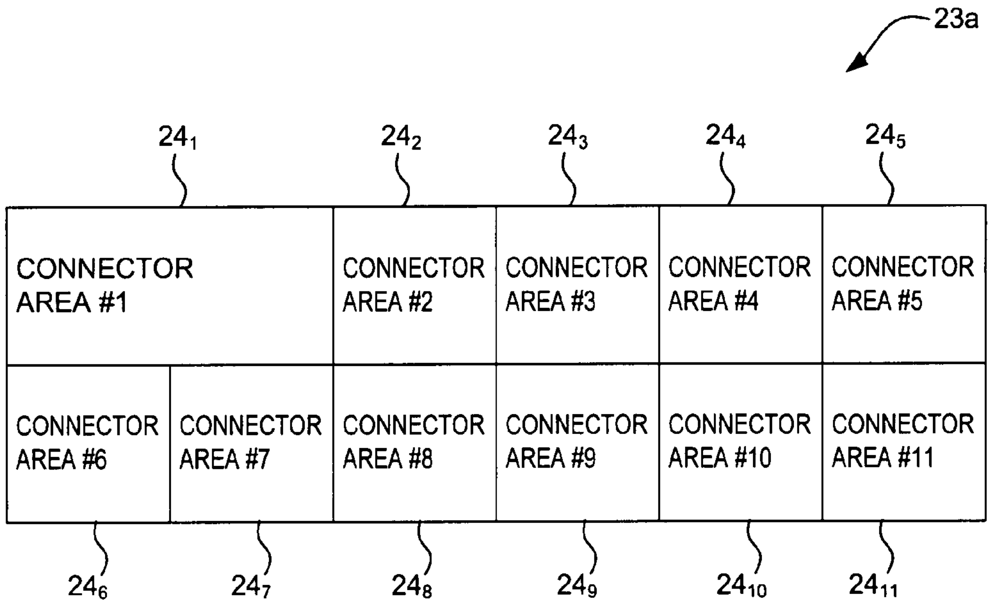
FIG. 12 is a schematic drawing of mounting areas on a base substrate.

As explained above, the base substrate 23*a* of the temperature controller 1A has eleven connectors 24. In FIG. 12, mounting areas (connector areas) $24_1$-$24_{11}$ on the module substrates 25 corresponding to the eleven connectors of this temperature controller 1A are schematically illustrated.

Table 1 shows an example of types of module substrates individually corresponding to these connector areas $24_1$-$24_{11}$ that may be preliminarily registered. In this example, a power module substrate which may be for AC100V-240V and AC/DC24V is intended to be mounted to the first connector area 241. Similarly, Table 1 shows what type of module substrate is intended to be mounted to each of the remaining connector areas $24_2$-$24_{11}$. In Table 1, "Alarm" indicates an alarm-output substrate and "OPT" indicates "optional" such as an event-input substrate.

If a module substrate which is not of the type preliminarily registered according to Table 1 is mounted to any of the connector areas $24_1$-$24_{11}$, it is to be judged that there is a connection error. In the example of Table 1, the ninth connector area $24_9$ is intended to be an empty area ("EMPTY") with no module substrate intended to be mounted thereto and no connectors being provided.

Also preliminarily registered according to the present embodiment of the invention are combinations of module substrates 25 to be mounted to the connector areas $24_1$-$24_{11}$ for each product type (such as type of temperature controller). Table 2 shows an example of such combinations preliminarily registered. In this example, Product Type A is the combination wherein either of the two kinds of power module substrates described above is mounted to the first connector area $24_1$, a relay output substrate with 4 output points ("Relay Output 4" or (RO4") is mounted to the second connector area $24_2$, no module substrate ("NONE") is mounted to the third through fifth connector areas $24_3$-$24_5$, output substrates (voltage pulse output ("Q output" or "Q") and linear current output ("C output" or "C") are mounted to the sixth connector area $24_6$, no module substrate is mounted to the seventh and eighth connector areas $24_7$ and $24_8$ the ninth connector area $24_9$ is empty as explained above, no module substrate is mounted to the tenth connector area $24_{10}$, and multi output substrate ("MO") and event input substrate with 2 input points ("EI2") mounted to the eleventh connector area $24_{11}$. In summary, such a combination of module substrates is preliminarily registered corresponding to the connector areas $24_1$-$24_{11}$ corresponding to Product Type A. Similarly, combinations of module substrates for the connector areas $24_{11}$-$24_{11}$ are preliminarily registered for other Product Types B, C, D . . . K. Thus, the main CPU 17 serves to identify the types of the module substrates 25 mounted to the individual connector areas $24_1$-$24_{11}$ of the base substrate 23*a*, to identify to product types on the basis thereof and to carry out control processes for the identified product types.

In order to detect connection errors, it is determined when the types of module substrates 25 mounted to the connector areas $24_1$-$24_{11}$ of the base substrate 23*a* are identified whether or not they are preliminarily registered module substrates in Table 1. In addition, it is determined whether they are module substrates 25 preliminarily registered as a combination in Table 2. If it is found not to be preliminarily registered, it is judged to be a connection error and a report is made to this effect and the start of a normal operation is prohibited.

Figure 13:
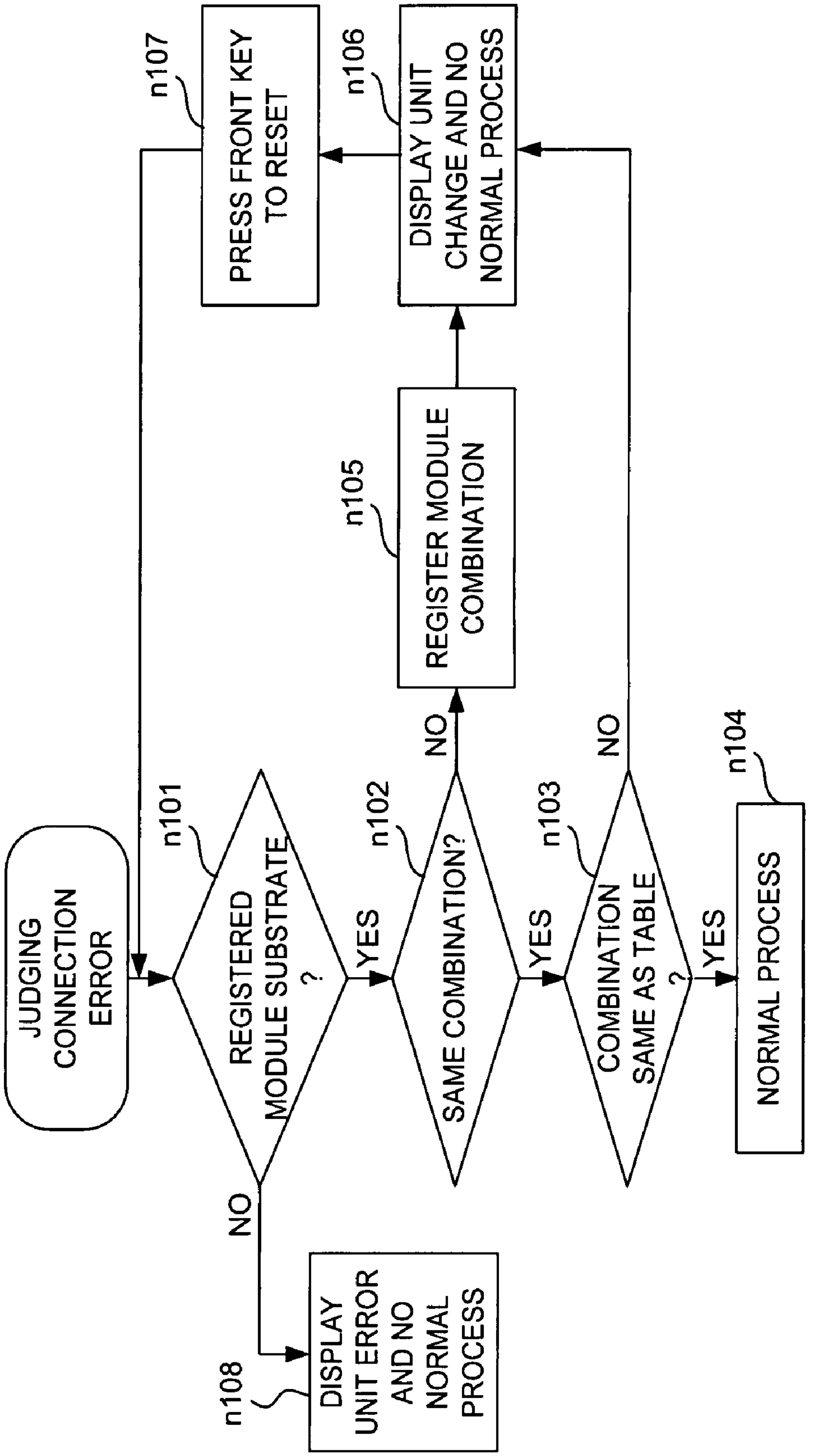
FIG. 13 is a flowchart of a process for judging a connection error.

This process of judging a connection error is explained next with reference to the flowchart of FIG. 13.

Each of the module substrates mounted to the connectors of the base substrates 23*a*-23*c* are identified as explained above and it is determined for each connector area whether it is a preliminarily registered module substrate or not (Step n101). If it is not a preliminarily registered module substrate (NO in Step n101), it is determined to be a connection error and a display "UNIT ERROR" is made on the display part 5*a*-5*c* and the start of a normal process is prevented (Step n108), thereby informing the user that there is a connection error.

If it is determined in Step 101 that it is a preliminarily registered module substrate (YES in Step 101), it is determined next whether it is the same combination of module substrates as before (Step n102). This is for the purpose of urging the user to check whether a module substrate has been changed or added by the user. If it is determined in Step n102 that it is the previous combination of module substrates (YES in Step n102), it is checked next whether this combination is the same as the preliminarily registered combination as in Table 2 (Step n103). If it is the same (YES in Step n103), the aforementioned normal process is started (Step n104).

If the user has changed a user substrate, it is determined in Step n102 that the combination of the module substrates is different from the previous time (NO in Step n102) and the new combination of module substrates is registered (Step n105) and a display "UNIT CHANGE" is made on the display part 5*a*-5*c* (Step n106) without starting the normal process. This display is continued until the user keeps pressing a front key for three seconds (Step n107). Until the user finishes pressing the front key for three seconds, the display is continued to keep informing the user that an exchange of module has taken place. If the user succeeds in keeping the front key pressed for three seconds, the combination becomes the same as the combination registered in Step n105 and the process returns to Step n103.

If the combination of module substrates is found not to match the preliminarily registered combination (NO in Step n103), the process returns to Step n106. If the front key is pressed for 3 seconds (Step n107), the process returns to Step n101 and the loop of Steps n102, n103 and n107 is repeated and the report on the connection error is continued.

In summary, if the module substrate (mounting substrate) for the second module connected to the base substrate for the first module is not the same as the preliminarily registered module substrate, not only is it judged to be a connection error and it is reported to this effect but also the shift to the normal process is prevented such that an erroneous operation due to the connection error can be prevented and the user can release the error condition.

Although the invention has been described above by way of only one example, the invention is not intended to be limited by this example. Many modifications and variations are possible within the scope of this invention. Although an example was shown above wherein the main CPU serving as the control circuit is provided to the input module, main CPU may be provided to the front module or another module. It also goes without saying that the present invention can be applied not only to temperature controllers but also to many other kinds of electronic apparatus such as digital panel meters, counters, timers and display devices. What is herein referred to as the base substrate need not be set along the front surface of the case, it may also be disposed differently.

It is also to be reminded that the distinction among the module substrates may be made on different principles. For example, each module substrate may be provided with a capacitor having a different charging time such that distinction among different module substrates may be made by the differences among their charging times. As another example, each module substrate may be provided with a microcomputer such that distinction may be made by reading out data. A method of identifying a connection error according to this invention may be used in combination with a prior art method using physical means.

In summary, the second module connected to the first module is identified and a connection error is detected if the second module is found not to be one that is preliminarily registered. Moreover, desired types of apparatus can be formed according to this invention by using a mounting substrate having a function corresponding to the desired type. Thus, such mounting substrates of one kind can be used in common among different types of apparatus having the same function and hence the cost involved in designing, production and maintenance can be significantly reduced.

TABLE 1

| Connector Area | Type | 1 | 2 | 3 | 4 | 5 | 6 |
|---|---|---|---|---|---|---|---|
| #1 | Power | AC100–240 V | AC/DC 24 V | | | | |
| #2 | Alarm | Relay output 4 | | | | | |
| #3 | Alarm | Relay output 4 | | | | | |
| #4 | OPT | Event input 4 | | | | | |
| #5 | OPT | Event input 4 | | | | | |
| #6 | Output | Q output + C output + Comm | Q output + C output | C output + C output + Comm. | C output + C output | Relay output 2 + Comm | Relay output 2 |
| #7 | Output | Q output + C output | C output + C output | Relay output 2 | | | |
| #8 | Output | Q output + C output | C output + C output | Relay output 2 | | | |
| #9 | Empty | | | | | | |
| #10 | Input(sub) | Multi input 2 (for sub) | | | | | |
| #11 | Input(main) | Multi input 2 (for main) | Multi-input + event 2 input | Multi-input + FB input | | | |

In Table 1:
"Comm" means communication;
"Relay output 2" indicates that the internal relay has 2 sets of output terminals;
"Relay output 4" indicates that the internal relay has 4 sets of output terminals;
"Multi input 2" means "Multi input + Multi input" or "dual multi-function inputs";
"Event input 4" means "event in-4 point" or "quatro event inputs";
"FB input" means position proportional input or feedback input;
"Q output" means voltage pulse output;
"C output" means linear current output.

TABLE 2

| Product | Connector Area | | | | | | | | | | |
|---|---|---|---|---|---|---|---|---|---|---|---|
| Type | #1 | #2 | #3 | #4 | #5 | #6 | #7 | #8 | #9 | #10 | #11 |
| A | Power | RO4 | None | None | None | Q + C | None | None | Empty | None | MO + EI2 |
| B | Power | RO4 | None | None | None | C + C | None | None | Empty | None | MO + EI2 |
| C | Power | RO4 | None | None | EI4 | Q + C + Comm | C + C | None | Empty | None | MO + EI2 |
| D | Power | RO4 | None | None | EI4 | RO2 | None | None | Empty | None | MI + FBI |
| E | Power | RO4 | None | None | EI4 | RO2 + Comm | Q + C | None | Empty | None | MI + FBI |
| F | Power | RO4 | None | None | EI4 | Q + C + Comm | Q + C | None | Empty | None | MI2(main) |
| G | Power | RO4 | None | None | EI4 | C + C + Comm | C + C | None | Empty | MI2(sub) | MI2(main) |
| H | Power | RO4 | None | None | None | None | None | None | Empty | None | MO + EI2 |
| I | Power | RO4 | None | None | None | None | None | None | Empty | None | MI + FBI |
| J | Power | RO4 | None | None | None | None | None | None | Empty | None | MI2(main) |
| K | Power | RO4 | None | None | None | None | None | None | Empty | MI2(sub) | MI2(main) |

In Table 2:
RO2: Relay output 2;
RO4: Relay output 4;
EI2: Event input 2;
EI4: Event input 4;
MO: Multi-output;
MI: Multi input;
MI2: Multi input + multi input or dual multi-function inputs;
FBI: Position proportional input or feedback input;
Q: Q output;
C: C output.

What is claimed is:

1. A method of identifying a connection error when a first module is electrically connected to a plurality of second modules, said method comprising the steps of:

distinguishing said second modules connected to said first module;

determining whether said distinguished second modules are preliminarily registered or not; and judging that there is a connection error if said distinguished second modules are not preliminarily registered;

wherein each of said steps is carried out by one of the modules selected from the group consisting of said first module and said plurality of second modules.

2. The method of claim 1 wherein said first module has a plurality of connectors, each of said second modules being mounted to a corresponding different one of said connectors, wherein said second modules are preliminarily registered for each of said connectors, and wherein said step of judging comprises judging for each of said connectors whether said distinguished second module is not preliminarily registered.

3. The method of claim 2 wherein a plurality of second modules are preliminarily registered as a combination corresponding to a plurality of said connectors and wherein said step of judging comprises judging whether or not the distinguished second modules are preliminarily registered as said combination.

4. The method of claim 1 wherein said step of judging comprises judging a connection error also if a module cannot be distinguished in said step of distinguishing.

5. The method of claim 1 further comprising the step of making a report when it is judged in said step of judging that there is a connection error.

6. An electronic apparatus comprising:

a first module having a plurality of connectors;

a plurality of second modules each connected to said first module through a different one of said connectors;

a registration part where a plurality of types of second modules are preliminarily registered;

a distinguishing part for distinguishing second modules connected to said connectors;

a determining part for determining whether the distinguished second modules are of a type preliminarily registered in said registration part; and a judging part for judging that there is a connection error of said second module if said distinguished second modules are determined to be not registered in said registration part.

7. The electronic apparatus of claim 6 wherein said types of second modules are registered corresponding to each of said connectors and wherein said determining part determines whether the distinguished second modules are each of a type preliminarily registered corresponding to each of said connectors.

8. The electronic apparatus of claim 7 wherein said types of second modules are preliminarily registered in said registration part as combinations corresponding to said connectors and said determining part determines whether or not the distinguished second modules are preliminarily registered as one of said combinations.

9. The electronic apparatus of claim 6 wherein said judging part judges that there is a connection error also when said distinguishing part fails to distinguish said second module.

10. The electronic apparatus of claim 6 further comprising a reporting part for making a report when said judging part judges that there is a connection error.

11. The electronic apparatus of claim 6 further comprising a limiting part that limits at least a portion of operations by said electronic apparatus when said judging part judges that there is connection error.

12. The electronic apparatus of claim 6 wherein said first module comprises a base substrate having common wiring that is connected to each of said connectors, said second modules each comprising a mounting substrate having a dedicated circuit corresponding to a specified function, said dedicated circuit becoming connected to said common wiring as said mounting substrate is connected to said connector, said second modules each further comprising a control circuit which is mounted either to said base substrate or to said mounting board and is connected to said common wiring, said control circuit including at least said distinguishing part, said determining part and said judging part, said control circuit serving to identify said mounting board connected to said connector of said base substrate and to function accordingly as a specified one of a plurality of types of apparatus.

* * * * *